US010658139B2

(12) United States Patent
Wakuda et al.

(10) Patent No.: US 10,658,139 B2
(45) Date of Patent: May 19, 2020

(54) INPUT DEVICE AND METHOD FOR CONTROLLING INPUT DEVICE

(71) Applicant: ALPS ALPINE CO., LTD., Tokyo (JP)

(72) Inventors: Hiroshi Wakuda, Miyagi (JP); Kazunari Takahashi, Miyagi (JP); Atsushi Goto, Miyagi (JP); Ryuichiro Yasuhara, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 136 days.

(21) Appl. No.: 15/825,559

(22) Filed: Nov. 29, 2017

(65) Prior Publication Data

US 2018/0090289 A1 Mar. 29, 2018

Related U.S. Application Data

(63) Continuation of application No. PCT/JP2016/067656, filed on Jun. 14, 2016.

(30) Foreign Application Priority Data

Jun. 22, 2015 (JP) ................................ 2015-124661

(51) Int. Cl.
*H01H 29/00* (2006.01)
*H01H 36/00* (2006.01)
(Continued)

(52) U.S. Cl.
CPC ............ *H01H 36/008* (2013.01); *G05G 1/10* (2013.01); *G05G 5/03* (2013.01)

(58) Field of Classification Search
CPC ........ H01H 36/008; H01F 9/535; G05G 1/08; G05G 1/10; G05G 5/03; G09G 3/36; G08B 7/06; G06F 3/016
(Continued)

(56) References Cited

U.S. PATENT DOCUMENTS 5,590,632 A * 1/1997 Kato ......................... F01L 1/34 123/480
2002/0057152 A1* 5/2002 Elferich .................. G05G 1/08 335/220
(Continued)

FOREIGN PATENT DOCUMENTS

DE 102004041690 3/2005
EP 1168622 1/2002
(Continued)

OTHER PUBLICATIONS

International Search Report dated Jul. 26, 2016 in PCT/JP2016/067656 filed on Jun. 14, 2016.
(Continued)

*Primary Examiner* — Shawki S Ismail
*Assistant Examiner* — Lisa N Homza
(74) *Attorney, Agent, or Firm* — IPUSA, PLLC

(57) ABSTRACT

An input device includes a first part and a second part configured to move relative to each other according to an input operation, a magnetic viscous fluid whose viscosity changes according to a magnetic field, and a magnetic-field generator that generates the magnetic field applied to the magnetic viscous fluid. The second part includes a first surface and a second surface that are arranged in a direction orthogonal to a direction of relative movement between the first part and the second part. Gaps are formed between the first surface and the first part and between the second surface and the first part, and the magnetic viscous fluid is present in at least a part of the gaps.

10 Claims, 10 Drawing Sheets

(51) Int. Cl.
*G05G 1/10* (2006.01)
*G05G 5/03* (2008.04)

(58) Field of Classification Search
USPC .............................................................. 335/47
See application file for complete search history.

(56) References Cited

U.S. PATENT DOCUMENTS

2003/0030407 A1* 2/2003 Maeda .................... B60K 37/06 318/727
2003/0094874 A1* 5/2003 Kaizuka ............... H02K 1/2786 310/156.45
2006/0110001 A1* 5/2006 Saint Vincent .......... H04R 7/20 381/396
2006/0115107 A1* 6/2006 Vincent .................... H04R 7/20 381/412
2006/0280575 A1* 12/2006 Ruettiger ............... B60K 37/06 411/15
2007/0193839 A1* 8/2007 Nakajima ............... F16F 9/535 188/267.2
2010/0107502 A1* 5/2010 Okada ................... F16D 37/008 49/349
2011/0128135 A1* 6/2011 Periquet .................. F16F 9/535 340/407.2
2011/0181405 A1* 7/2011 Periquet .................. F16F 9/535 340/407.2
2011/0303170 A1* 12/2011 Morishima ............. F01L 1/352 123/90.17
2013/0042492 A1* 2/2013 Nishimura .............. D06F 33/02 34/108
2013/0074793 A1* 3/2013 Washino ................. F01L 1/344 123/90.17
2015/0041263 A1* 2/2015 Saito ....................... F16F 9/535 188/267.2
2015/0059674 A1* 3/2015 Washino ............. F01L 1/34409 123/90.17
2015/0152939 A1* 6/2015 Mochizuki ................ F16F 9/53 92/85 B
2015/0197307 A1* 7/2015 Mochizuki ............ F16F 13/007 267/221
2016/0071667 A1* 3/2016 Takahashi .............. H01H 19/14 335/207
2016/0216762 A1 7/2016 Vanhelle et al.
2016/0229254 A1* 8/2016 Teraoka ..................... F16F 9/50
2016/0229255 A1* 8/2016 Teraoka ..................... F16F 9/50
2016/0274665 A1* 9/2016 Wakuda ................ B06B 1/0207
2016/0288605 A1* 10/2016 Teraoka ................. B60G 13/08
2017/0336880 A1* 11/2017 Wakuda ................ G06F 3/0338
2018/0080511 A1* 3/2018 Takahashi .............. B62D 5/006
2018/0090289 A1* 3/2018 Wakuda ................... G05G 1/10
2018/0320749 A1* 11/2018 Takahashi ................ G05G 5/03
2018/0320750 A1* 11/2018 Takahashi ............... F16F 9/535
2019/0146546 A1* 5/2019 Goto .......................... F16F 9/53
2019/0179356 A1* 6/2019 Goto .......................... F16F 9/53
2019/0286184 A1* 9/2019 Takahashi ................. H01F 1/44

FOREIGN PATENT DOCUMENTS

| | | |
|---|---|---|
| EP | 1217496 | 6/2002 |
| EP | 2594423 | 5/2013 |
| FR | 2930654 | 10/2009 |
| JP | 2003-050639 | 2/2003 |
| JP | 2009-069931 | 4/2009 |
| JP | 2011-519098 | 6/2011 |
| JP | 2011-519099 | 6/2011 |
| JP | 2014-181778 | 9/2014 |
| JP | 2015-008593 | 1/2015 |
| WO | 2015033035 | 3/2015 |

OTHER PUBLICATIONS

Extended European Search Report for 16814226.3 dated Jun. 5, 2018.

* cited by examiner

INPUT DEVICE AND METHOD FOR CONTROLLING INPUT DEVICE

CROSS-REFERENCE TO RELATED APPLICATIONS

The present application is a continuation application filed under 35 U.S.C. 111(a) claiming benefit under 35 U.S.C. 120 and 365(c) of PCT International Application No. PCT/JP2016/067656, filed on Jun. 14, 2016, which is based on and claims the benefit of priority of Japanese Patent Application No. 2015-124661 filed on Jun. 22, 2015, the entire contents of which are incorporated herein by reference.

BACKGROUND OF THE INVENTION

1. Field of the Invention

An aspect of this disclosure relates to an input device and a method for controlling the input device.

2. Description of the Related Art

There are known input devices that provide a dynamic operational sensation (or operation feeling) to an operator when the operator operates one of two components that rotate relative to each other. Japanese Laid-Open Patent Publication No. 2003-050639 discloses an input device that generates an operation feeling by generating torque with a motor in a direction that is opposite the direction of operation. Japanese Laid-Open Patent Publication No. 2015-008593 discloses an input device that generates an operation feeling by changing a frictional force between solids using attraction of magnetic materials in the solids.

However, using a motor as in Japanese Laid-Open Patent Publication No. 2003-050639 has a disadvantage that the size of the input device increases. Also, using a frictional force as in Japanese Laid-Open Patent Publication No. 2015-008593 has a disadvantage that a contact sound is generated when the solids in a noncontact state are brought into contact with each other.

SUMMARY OF THE INVENTION

In an aspect of this disclosure, there is provided an input device including a first part and a second part configured to move relative to each other according to an input operation, a magnetic viscous fluid whose viscosity changes according to a magnetic field, and a magnetic-field generator that generates the magnetic field applied to the magnetic viscous fluid. The second part includes a first surface and a second surface that are arranged in a direction orthogonal to a direction of relative movement between the first part and the second part. Gaps are formed between the first surface and the first part and between the second surface and the first part, and the magnetic viscous fluid is present in at, least a part of the gaps.

DESCRIPTION OF THE PREFERRED EMBODIMENTS

Embodiments of the present invention are described below with reference to the accompanying drawings.

Figure 1:
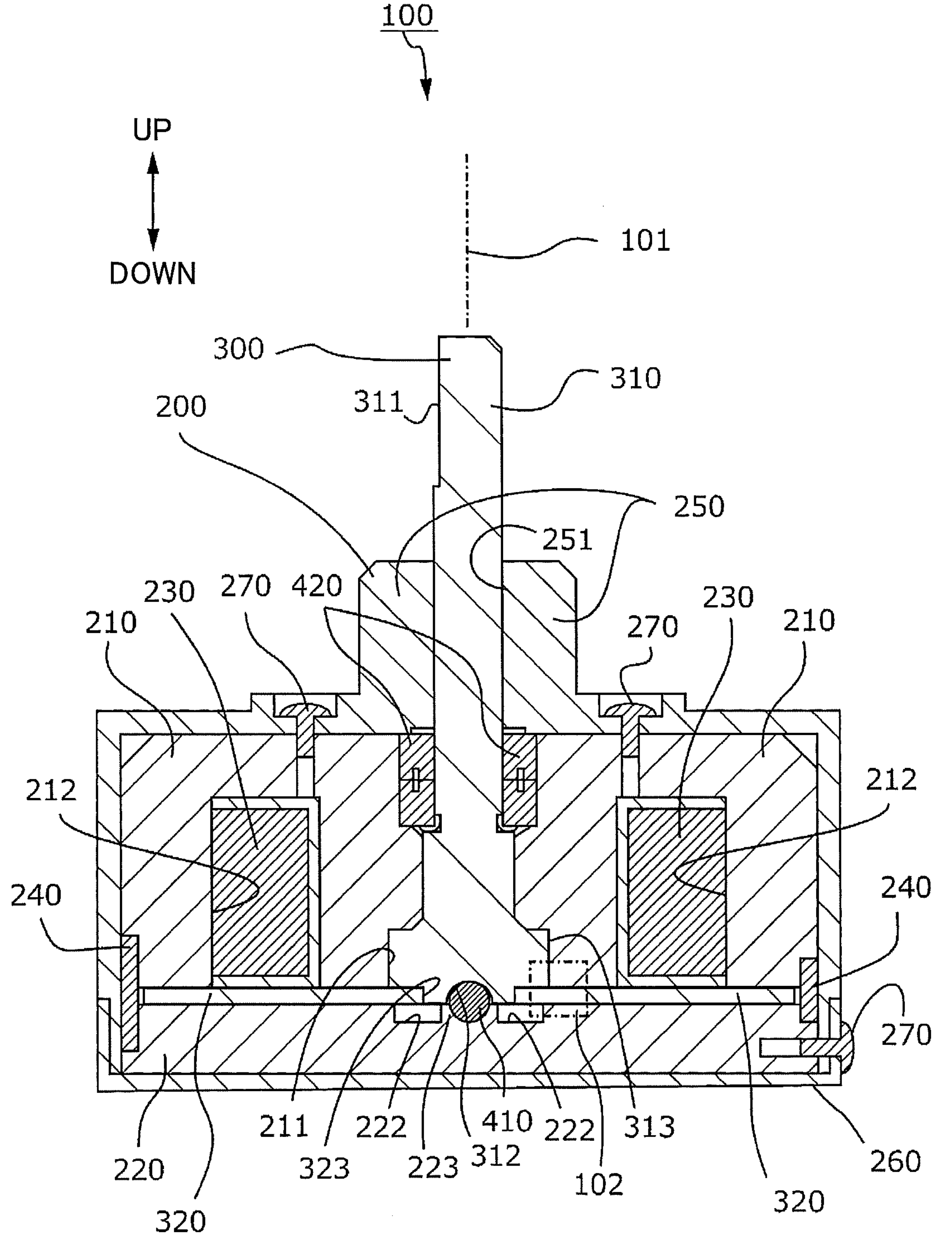
FIG. 1 is a cross-sectional view of an input device according to a first embodiment of the present invention.
Figure 2:
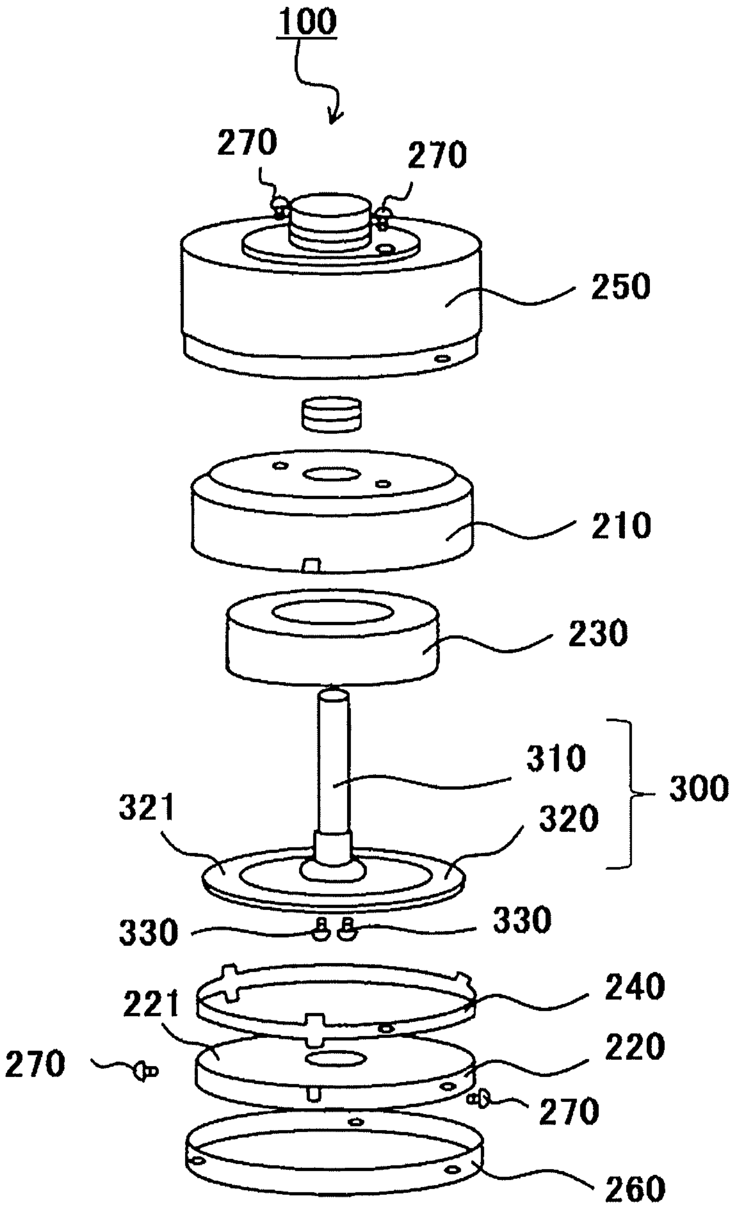
FIG. 2 is an exploded perspective view of the input device of FIG. 1.
Figure 3:
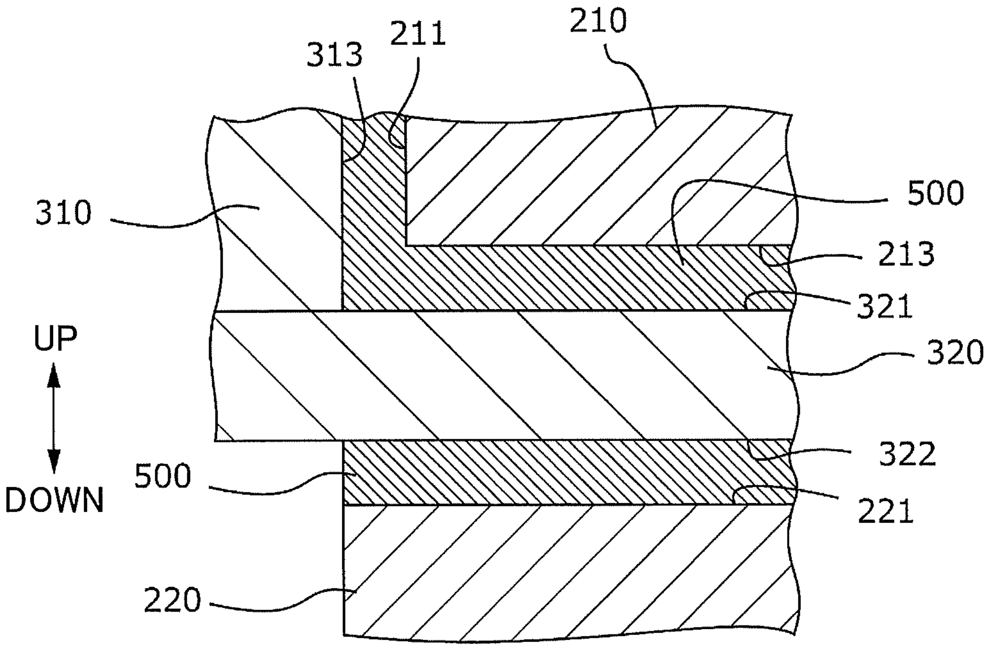
FIG. 3 is an enlarged cross-sectional view of the input device of FIG. 1.

An input device 100 according to a first embodiment of the present invention is described below. FIG. 1 is a cross-sectional view of the input device 100 taken along a plane including a central axis 101 of rotation and seen in a direction that is orthogonal to the central axis 101. FIG. 2 is an exploded perspective view of the input device 100. FIG. 3 is a partial enlarged view of an area 102 of the input device 100 in FIG. 1.

In FIGS. 1 through 3, for descriptive purposes, a direction along the central axis 101 is defined as the vertical direction. However, this does not limit the direction of the input device 100 when the input device 100 is actually used. A radial direction indicates a direction that is orthogonal to and extending away from the central axis 101.

As illustrated in FIG. 1, the input device 100 includes a first part 200 and a second part 300 that rotate relative to each other in both directions around the central axis 101, a spherical part 410, and an annular bearing 420. As illustrated in FIG. 3, the input device 100 also includes a magnetic viscous fluid 500.

First, a configuration of the first part 200 is described. The first part 200 includes a first fixed yoke 210, a second fixed yoke 220, a magnetic-field generator 230, an annular part 240, an upper case 250, and a lower case 260.

The first fixed yoke 210 has a substantially-columnar shape, and includes a fixed inner bore 211 having a cylindrical shape around the central axis 101. The fixed inner bore 211 passes through the first fixed yoke 210 in the direction of the central axis 101. A cross section of the fixed inner bore 211 along a plane orthogonal to the central axis 101 has a substantially-circular shape. The fixed inner bore 211 has various diameters depending on positions in the vertical direction.

The first part 200 includes an annular cavity 212. In a cross section of the annular cavity 212 orthogonal to the central axis 101, the inner circumference and the outer circumference of the annular cavity 212 form concentric circles around the central axis 101. The upper side, the outer side in the radial direction, and the inner side in the radial direction of the annular cavity 212 are closed, and the lower side of the annular cavity 212 is open.

As illustrated in FIG. 2, the magnetic-field generator 230 is disposed in the annular cavity 212. The magnetic-field generator 230 has a shape similar to the shape of the annular cavity 212, and is a coil including a conductor wire wound around the central axis 101. An alternating current is supplied to the magnetic-field generator 230 via a path not shown. When the alternating current is supplied to the magnetic-field generator 230, a magnetic field is generated.

As illustrated in FIG. 3, the first fixed yoke 210 includes a fixed lower surface 213. Most part of the fixed lower surface 213 is substantially parallel to a plane that is orthogonal to the vertical direction.

As illustrated in FIG. 1, the second fixed yoke 220 disposed below the first fixed yoke 210 has a substantially-columnar shape. As illustrated in FIG. 3, the second fixed yoke 220 includes a fixed upper surface 221. Most part of the fixed upper surface 221 is substantially parallel to a plane that is orthogonal to the vertical direction.

As illustrated in FIG. 1, an annular groove 222 surrounding the central axis 101 is formed in the fixed upper surface 221. The upper side of the groove 222 is open. As illustrated in FIG. 1, a first bearing 223 is provided in the middle of the fixed upper surface 221 illustrated in FIG. 3. The upper side of the first bearing 223 rotatably receives the spherical part 410.

As illustrated in FIG. 3, the fixed lower surface 213 of the first fixed yoke 210 and the fixed upper surface 221 of the second fixed yoke 220 are substantially parallel to each other, and a gap is formed between the fixed lower surface 213 and the fixed upper surface 221.

As illustrated in FIG. 2, the annular part 240 has a substantially-cylindrical shape. As illustrated in FIG. 1, the annular part 240 seals a space between the first fixed yoke 210 and the second fixed yoke 220 from the outer side in the radial direction.

As illustrated in FIG. 1, the upper case 250 covers the upper sides and the outer sides in the radial direction of the first fixed yoke 210, the second fixed yoke 220, and the annular part 240. The upper case 250 and the first fixed yoke 210 are fixed to each other with multiple screws 270. The upper case 250 includes a through hole 251 having a substantially-columnar shape in a region including the central axis 101. The through hole 251 passes through the upper case 250 in the vertical direction. The space in the fixed inner bore 211 communicates with the space in the through hole 251 in the vertical direction.

The lower case 260 covers the lower sides of the first fixed yoke 210, the second fixed yoke 220, and the annular part 240. The lower case 260, the upper case 250, and the second fixed yoke 220 are fixed to each other with multiple screws 270.

Next, a configuration of the second part 300 is described. The second part 300 includes a shaft 310 and a rotating yoke 320.

The shaft 310 is long along the central axis 101, and is formed by monolithically joining multiple columns having different diameters in the radial direction one above the other. The shaft 310 includes a portion that is disposed in a space formed by the fixed inner bore 211 of the first fixed yoke 210 and the through hole 251 of the upper case 250, and a portion that protrudes upward from the upper case 250.

The shaft 310 includes a flat surface 311 that extends along the central axis 101 and is formed in a part of the outer surface of the shaft 310 in the radial direction. The flat surface 311 is formed near the upper end of the portion of the shaft 310 above the upper case 250. A part necessary for an input operation, i.e., a part necessary to rotate the shaft 310, may be mounted near the flat surface 311 as needed.

The annular bearing 420 is provided near the upper end of the first fixed yoke 210 between the inner surface of the fixed inner bore 211 of the first fixed yoke 210 and the shaft 310. The annular bearing 420 enables the first fixed yoke 210 and the shaft 310 to rotate smoothly relative to each other.

A second bearing 312 facing downward is provided at the lower end of the shaft 310. The second bearing 312 rotatably receives the spherical part 410 disposed below the second bearing 312. With the spherical part 410 sandwiched vertically between the first bearing 223 and the second bearing 312, the shaft 310 and the second fixed yoke 220 can smoothly rotate relative to each other.

Below the annular bearing 420, as illustrated in FIG. 3, a rotating outer surface 313 on the outer side of the shaft 310 in the radial direction is disposed close to the inner surface of the fixed inner bore 211 of the first fixed yoke 210. When the shaft 310 rotates relative to the first fixed yoke 210, the distance between the rotating outer surface 313 and the inner surface of the fixed inner bore 211 is kept substantially constant in a plane that is orthogonal to the central axis 101.

As illustrated in FIG. 3, the rotating yoke 320 is a disc-shaped part including a rotating upper surface 321 and a rotating lower surface 322 that are substantially parallel to a plane orthogonal to the vertical direction. The rotating upper surface 321 faces upward, and the rotating lower surface 322 faces downward.

The rotating yoke 320 is disposed in a space between the first fixed yoke 210 and the second fixed yoke 220. There is a gap between the rotating upper surface 321 and the fixed lower surface 213 of the first fixed yoke 210.

Also, there is a gap between the rotating lower surface 322 and the fixed upper surface 221 of the second fixed yoke 220. When the rotating yoke 320 rotates relative to the first fixed yoke 210 and the second fixed yoke 220, the vertical distance between the rotating upper surface 321 and the fixed lower surface 213 is kept substantially constant, and the vertical distance between the rotating lower surface 322 and the fixed upper surface 221 is kept substantially constant.

As illustrated in FIG. 1, the rotating yoke 320 includes a through hole 323 that is formed near the central axis 101 and passes through the rotating yoke 320 in the vertical direction.

The lower end of the shaft 310 is disposed in the through hole 323 of the rotating yoke 320, and the rotating yoke 320 and the shaft 310 are fixed to each other with multiple screws 330 illustrated in FIG. 2. Accordingly, the shaft 310 and the rotating yoke 320 rotate together.

At least one of the first fixed yoke 210, the second fixed yoke 220, and the rotating yoke 320 is preferably formed of a magnetic material. Using a magnetic material strengthens the magnetic field generated by the magnetic-field generator 230 and thereby makes it possible to save energy.

As illustrated in FIG. 3, the magnetic viscous fluid 500 is present in a gap sandwiched in the radial direction between the rotating outer surface 313 of the shaft 310 and the inner surface of the fixed inner bore 211 of the first fixed yoke 210.

Also, the magnetic viscous fluid 500 is present in a gap sandwiched in the vertical direction between the rotating upper surface 321 of the rotating yoke 320 and the fixed lower surface 213 of the first fixed yoke 210.

Further, the magnetic viscous fluid 500 is present in a gap sandwiched in the vertical direction between the rotating lower surface 322 of the rotating yoke 320 and the fixed upper surface 221 of the second fixed yoke 220. However, not all of the gaps are necessarily filled with the magnetic viscous fluid 500. For example, the magnetic viscous fluid 500 may be present only on the side of the rotating upper surface 321 or the side of the rotating lower surface 322. The magnetic viscous fluid 500 is in contact with and spread as a thin film over the rotating yoke 320 and the fixed yokes 210 and 220.

Figure 4A:
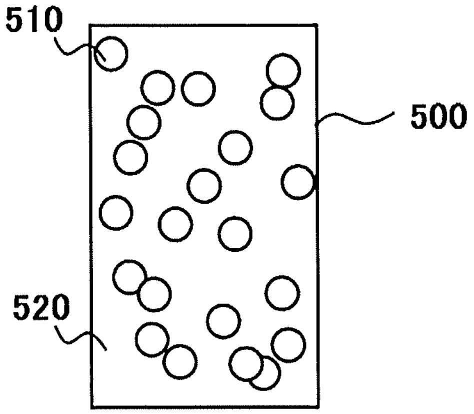
FIG. 4A is a drawing illustrating a magnetic viscous fluid in a state where no magnetic field is applied.

The magnetic viscous fluid 500 is a substance whose viscosity changes when a magnetic field is applied. The viscosity of the magnetic viscous fluid 500 of the present embodiment increases as the intensity of the magnetic field increases within a certain range. As illustrated in FIG. 4A, the magnetic viscous fluid 500 includes a large number of particles 510.

The particles 510 are, for example, ferrite particles. The diameter of the particles 510 is, for example, in the order of a micrometer and may be 100 nanometers. The particles 510 are preferably made of a substance that is unlikely to be precipitated by gravity. The magnetic viscous fluid 500 preferably includes a coupling agent 520 that prevents precipitation of the particles 510.

A first state where no electric current is supplied to the magnetic-field generator 230 in FIG. 1 is discussed. In the first state, because no magnetic field is generated by the magnetic-field generator 230, no magnetic field is applied to the magnetic viscous fluid 500 in FIG. 3.

As illustrated in FIG. 4A, when no magnetic field is applied to the magnetic viscous fluid 500, the particles 510 are randomly dispersed. Accordingly, the first part 200 and the second part 300 rotate relative to each other without much resistance. That is, an operator manually operating the shaft 310 does not feel much resistance.

Next, a second state where an electric current is supplied to the magnetic-field generator 230 in FIG. 1 is discussed. In the second state, because a magnetic field is generated around the magnetic-field generator 230, the magnetic field is applied to the magnetic viscous fluid 500 in FIG. 3.

Figure 4B:
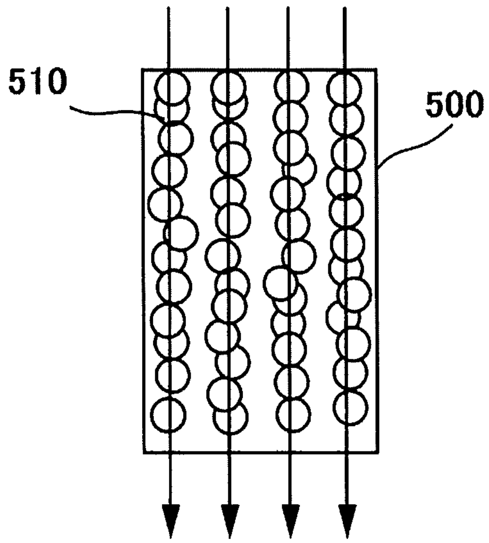
FIG. 4B is a drawing illustrating a magnetic viscous fluid in a state where a magnetic field is applied.

As illustrated in FIG. 4B, when a magnetic field is applied to the magnetic viscous fluid 500, the particles 510 are linked linearly along the direction of the magnetic field indicated by arrows. A large force is necessary to cut off the linked particles 510.

Because the resistance against the movement in a direction orthogonal to the magnetic field is particularly large, it is preferable to generate the magnetic field such that components of the magnetic field in a direction orthogonal to the direction of relative movement between the first part 200 and the second part 300 become large. The magnetic viscous fluid 500 also exhibits a certain degree of resistance against a movement in a direction that is inclined with respect to the magnetic field.

In the second state, a magnetic field including components along the central axis 101 is generated in a gap between the rotating yoke 320 and the first fixed yoke 210 and a gap between the rotating yoke 320 and the second fixed yoke 220. As illustrated in FIG. 4B, because the particles 510 of the magnetic viscous fluid 500 are linked in the vertical direction or a direction inclined with respect to the vertical direction, it becomes difficult for the first part 200 and the second part 300 to rotate relative to each other.

That is, resistance is generated in a direction opposite the direction of relative movement between the first part 200 and the second part 300 and as a result, an operator manually operating the shaft 310 feels resistance. Because the second part 300 includes the rotating yoke 320 that has a disc shape extending outward in the radial direction from the shaft 310, the magnetic viscous fluid 500 can be applied to a larger area compared with a case where the second part 300 includes only the shaft 310. The control range of resistance increases as the area of the magnetic viscous fluid 500 increases.

In the second state, a magnetic field is also applied to the magnetic viscous fluid 500 that is present in a gap between the shaft 310 and the first fixed yoke 210. The resistance between the shaft 310 and the first fixed yoke 210 increases as the radial-direction component of the magnetic field increases.

In the present embodiment, although the radial-direction component of the magnetic field orthogonal to the central axis 101 is small, the operator can still feel a certain level of resistance. The resistance can be controlled using a smaller area by providing the magnetic viscous fluid 500 around the shaft 310 and not providing the magnetic viscous fluid 500 above and below the rotating yoke 320.

Figure 5:
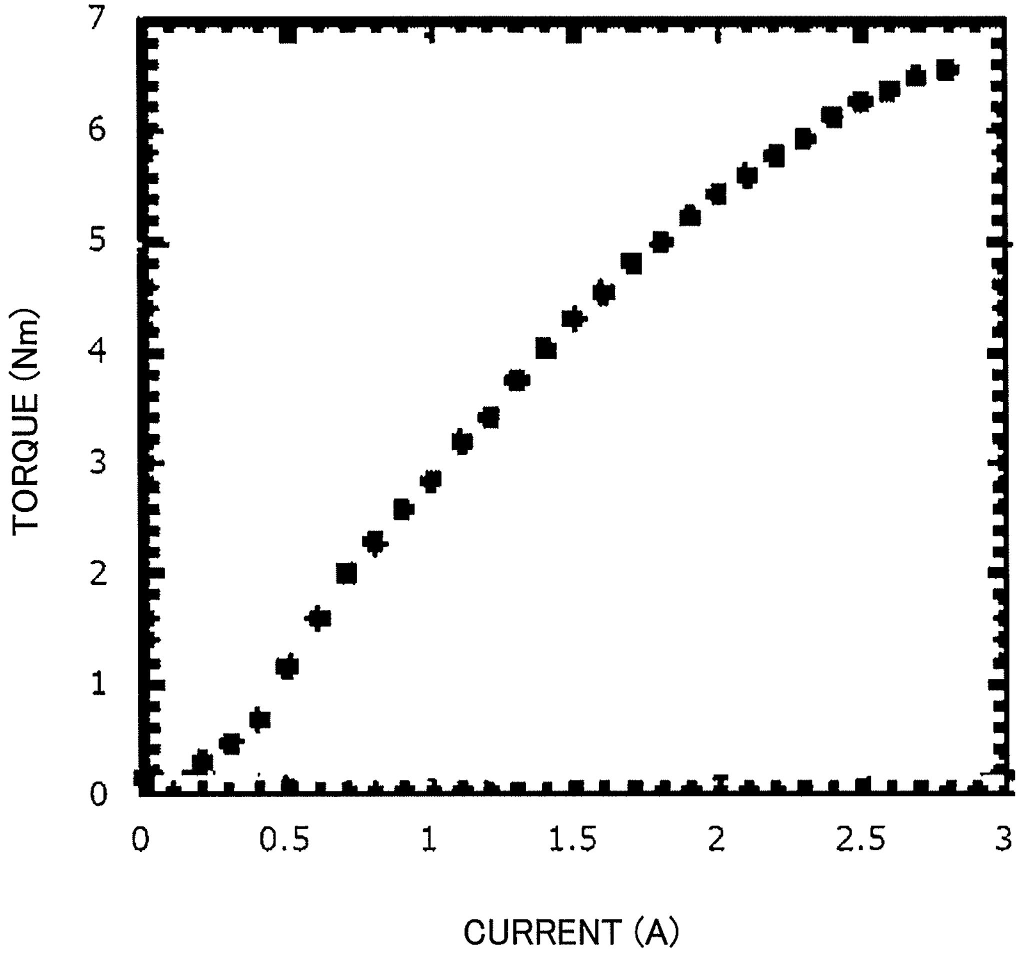
FIG. 5 is a graph illustrating a relationship between an electric current supplied to a magnetic-field generator in FIG. 1 and torque.

FIG. 5 is a graph illustrating results of an experiment, and indicates a relationship between an electric current supplied to the magnetic-field generator 230 and torque received by the shaft 310. The torque corresponds to resistance. As illustrated by FIG. 5, when the electric current supplied to the magnetic-field generator 230 is increased, the magnetic field increases and the resistance between the first part 200 and the second part 300 increases. When the electric current supplied to the magnetic-field generator 230 is decreased, the magnetic field decreases and the resistance between the first part 200 and the second part 300 decreases.

Figure 6:
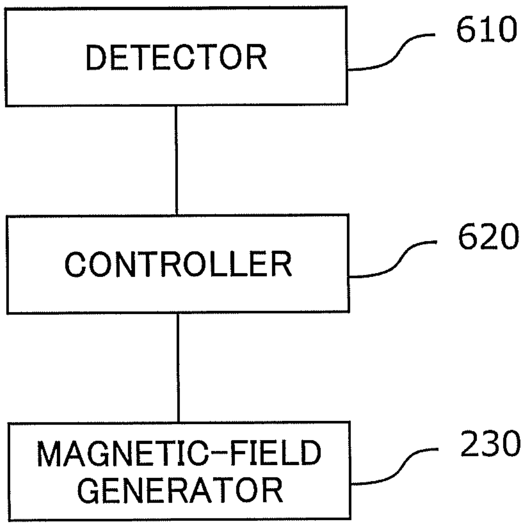
FIG. 6 is a block diagram illustrating a control system of the input device of FIG. 1.

FIG. 6 is a block diagram illustrating a control system of the input device 100. The input device 100 also includes a detector 610 and a controller 620. The detector 610 detects a relative position between the first part 200 and the second part 300 using a mechanical method, an electromagnetic method, an optical method, or any other method. The detector 610 is, for example, a rotary encoder.

The controller 620 controls the intensity of the magnetic field generated by the magnetic-field generator 230 based on the position detected by the detector 610. The controller 620 controls the intensity of the magnetic field to be applied to the magnetic viscous fluid 500 by controlling the electric current supplied to the magnetic-field generator 230.

The controller 620, for example, includes a central processing unit and a memory and performs a control process by executing a program stored in the memory by the central processing unit. For example, the controller 620 increases the magnetic field when the relative angle between the first part 200 and the second part 300 is within a predetermined range, and decreases the magnetic field when the relative angle is out of the predetermined range.

The relationship between the position detected by the detector 610 and the intensity of the magnetic field may be calculated, defined in advance in a table, or determined by any other method.

The detector 610 may also be configured to detect a relative speed between the first part 200 and the second part 300, relative acceleration between the first part 200 and the second part 300, or any other measurement indicating a relationship between the first part 200 and the second part 300. The controller 620 may be configured to change the intensity of the magnetic field based on the speed, the acceleration, the measurement, or any other input.

Figure 7:
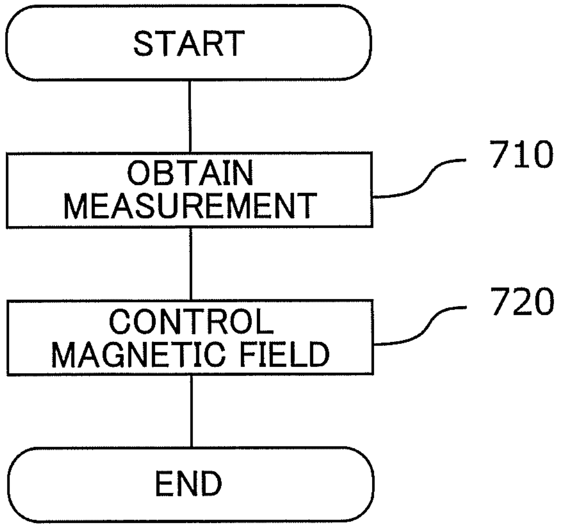
FIG. 7 is a flowchart illustrating a method for controlling the input device of FIG. 1.

FIG. 7 is a flowchart illustrating a control method performed by the controller 620. At step 710, the controller 620 obtains a measurement detected by the detector 610. In the present embodiment, the measurement indicates a relative position between the first part 200 and the second part 300.

Next, at step 720, the controller 620 controls the magnetic field to be generated by the magnetic-field generator 230 based on a pre-stored relationship between the measurement and the electric current supplied to the magnetic-field generator 230. Step 710 and step 720 are repeated as necessary.

In the input device 100 of the present embodiment, the magnetic viscous fluid 500 is used to control the resistance against relative rotation between the first part 200 and the second part 300. This configuration makes it possible to reduce the size of the input device 100 compared with a related-art configuration where a motor is used, and makes it possible to generate an operation feeling more quietly compared with a related-art configuration where a frictional force between solids is used.

The input device 100 of the present embodiment can generate various operation feelings by changing the magnetic field based on a position, a speed, acceleration, or any other measurement. The input device 100 may include multiple magnetic-field generators 230. Also, the magnetic-field generator 230 may be configured to generate a magnetic field in a position and a direction that are different from those in the present embodiment.

Although an alternating current is supplied to the magnetic-field generator 230 in the present embodiment, a direct current may instead be supplied to the magnetic-field generator 230. Using a direct current makes it possible to give the operator constant resistance corresponding to the current intensity, and to linearly change the level of resistance by changing the current intensity. In contrast, using an alternating current makes it possible to vary the intensity of a generated magnetic field at a regular interval corresponding to the waveform of the alternating current, and to give the operator regularly-varying resistance as an operation feeling. Thus, when a direct current is used, it is necessary to perform a control process to repeatedly increase and decrease the current intensity in order to generate regularly-varying resistance as an operation feeling. In contrast, when an alternating current is used, regularly-varying resistance can be easily generated without performing such a control process.

Figure 8:
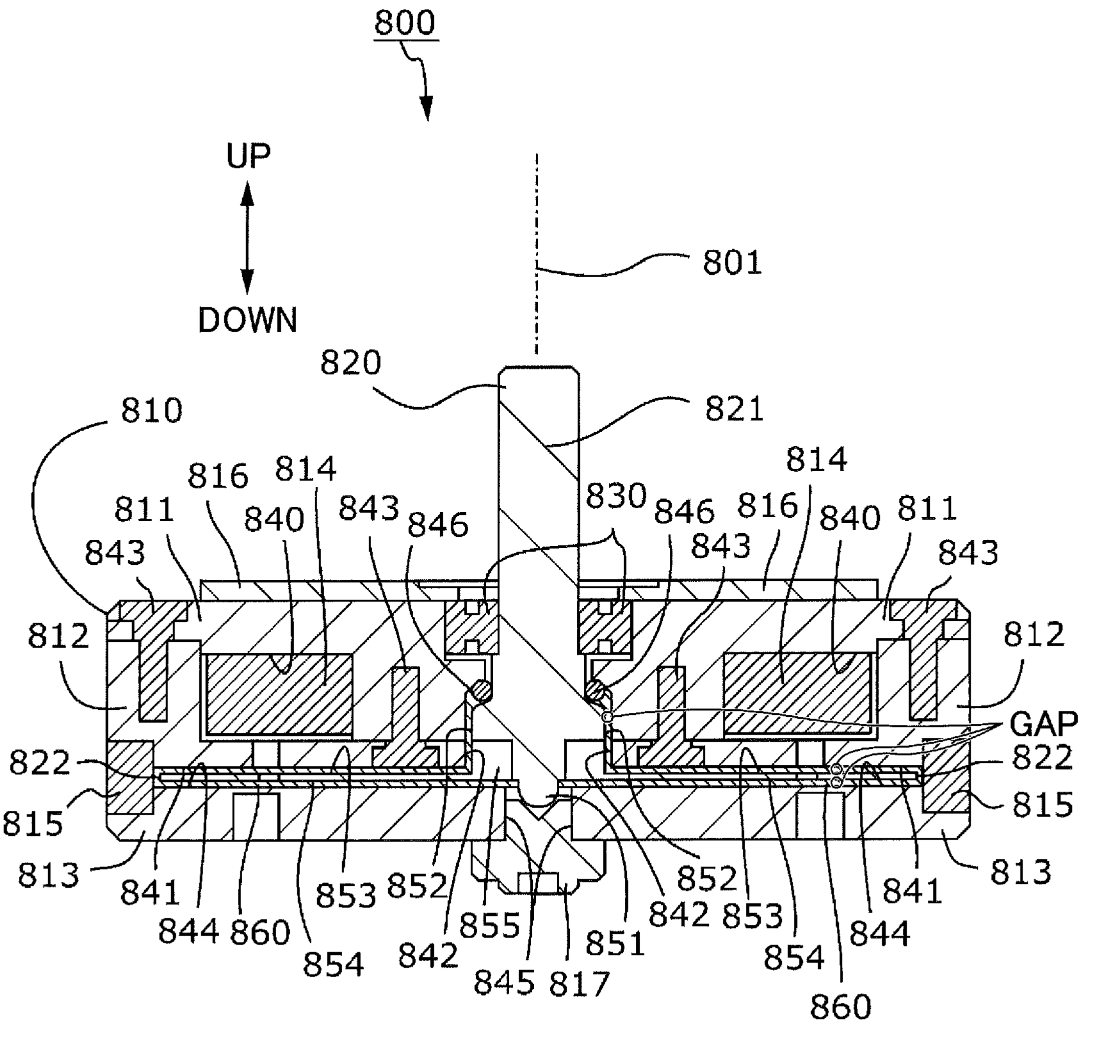
FIG. 8 is a cross-sectional view of an input device according to a second embodiment.

FIG. 8 illustrates an input device 800 according to a second embodiment. FIG. 8 is a cross-sectional view of the input device 800 taken along a plane including a central axis 801. For descriptive purposes, a direction along the central axis 801 is defined as the vertical direction. However, this does not limit the direction of the input device 800 when the input device 800 is actually used.

A radial direction indicates a direction that is orthogonal to and extending away from the central axis 801. The input device 800 includes a first part 810 and a second part 820 that rotate relative to each other in both directions around the central axis 801, an annular bearing 830, and a magnetic viscous fluid 860.

The first part 810 includes a first fixed yoke 811, a second fixed yoke 812, a third fixed yoke 813, a magnetic-field generator 814, an annular part 815, a lid 816, and an end bearing 817.

A recess 840 is formed in a lower-outer side of the first fixed yoke 811. The recess 840 has a ring shape whose center is located on the central axis 801. The magnetic-field generator 814 is disposed in the recess 840.

The magnetic-field generator 814 includes a coil including a conductor wire that is wound around the central axis 801 in the recess 840. An alternating current is supplied to the magnetic-field generator 814 via a path not shown. An upper part of the first fixed yoke 811 is covered by the lid 816 having a disc shape.

The second fixed yoke 812 is disposed below the first fixed yoke 811. The first fixed yoke 811 and the second fixed yoke 812 together form a substantially-cylindrical outer shape and enclose the magnetic-field generator 814. The second fixed yoke 812 includes a fixed lower surface 841. Most part of the fixed lower surface 841 is substantially parallel to a plane that is orthogonal to the central axis 801.

The first fixed yoke 811, the second fixed yoke 812, and the lid 816 define a fixed inner bore 842 that is a through hole along the central axis 801. The cross section of the fixed inner bore 842, which is orthogonal to the central axis 801, has a substantially-circular shape at any position in the vertical direction. The diameter of the cross section of the fixed inner bore 842 varies depending on positions in the vertical direction. The first fixed yoke 811 and the second fixed yoke 812 are fixed to each other with multiple screws 843.

The third fixed yoke 813 includes a fixed upper surface 844. Most part of the fixed upper surface 844 is substantially parallel to a plane that is orthogonal to the central axis 801. That is, most part of the fixed lower surface 841 of the second fixed yoke 812 and most part of the fixed upper surface 844 of the third fixed yoke 813 are substantially parallel to each other.

There is a gap between the fixed lower surface 841 and the fixed upper surface 844. The height of the gap in the vertical direction is substantially constant. A through hole 845 is formed in the center of the third fixed yoke 813. The space in the through hole 845 communicates with the space in the fixed inner bore 842 in the vertical direction. The end bearing 817 is screwed into the through hole 845 in an upward direction.

The annular part 815 has a substantially-cylindrical shape, and seals a space between the second fixed yoke 812 and the third fixed yoke 813 from the outer side in the radial direction. A screw structure formed on the inner side of the annular part 815 in the radial direction engages with a screw structure formed on the outer sides of the second fixed yoke 812 and the third fixed yoke 813 in the radial direction, and the second fixed yoke 812 and the third fixed yoke 813 are thereby fixed to each other.

The second part 820 includes a shaft 821 and a rotating yoke 822.

The shaft 821 is long along the central axis 801. In a cross-sectional view orthogonal to the central axis 801, most part of the shaft 821 has a shape of a circle around the central axis 801 at any position in the vertical direction. The diameter of the circle varies depending on positions in the vertical direction. The shaft 821 includes a portion that is present in the first part 810 and a portion that protrudes upward from the first part 810. A part necessary for an input operation, i.e., a part necessary to rotate the shaft 821, may be mounted near the upper end of the shaft 821 as needed.

The annular bearing 830 is provided near the upper end of the first fixed yoke 811 between the first fixed yoke 811 and the shaft 821. The annular bearing 830 enables the first fixed yoke 811 and the shaft 821 to rotate smoothly relative to each other. A hemispherical part 851 protruding downward is provided at the lower end of the shaft 821. The upper surface of the end bearing 817 has a structure that rotatably receives the hemispherical part 851 of the shaft 821. With the hemispherical part 851 being in contact with the end bearing 817, the shaft 821 can smoothly rotate.

The rotating yoke 822 is a disc-shaped part that includes a rotating upper surface 853 (first surface) and a rotating lower surface 854 (second surface). The rotating upper surface 853 and the rotating lower surface 854 are substantially parallel to a plane that is orthogonal to the vertical direction. The rotating upper surface 853 faces upward, and the rotating lower surface 854 faces downward. The rotating yoke 822 is disposed in a space between the second fixed yoke 812 and the third fixed yoke 813.

There is a gap between the rotating upper surface 853 and the fixed lower surface 841 of the second fixed yoke 812, and there is a gap between the rotating lower surface 854 and the fixed upper surface 844 of the third fixed yoke 813. When the rotating yoke 822 rotates relative to the second fixed yoke 812 and the third fixed yoke 813, the vertical distance between the rotating upper surface 853 and the fixed lower surface 841 is kept substantially constant, and the vertical distance between the rotating lower surface 854 and the fixed upper surface 844 is kept substantially constant.

The rotating yoke 822 includes a raised part 855 that protrudes upward and is located near the central axis 801. The raised part 855 includes a through hole that passes through the rotating yoke 822 in the vertical direction. The lower end of the shaft 821 is inserted in the through hole of the rotating yoke 822, and the rotating yoke 822 and the shaft 821 are fixed to each other with multiple screws. Accordingly, the shaft 821 and the rotating yoke 822 rotate together.

Below the annular bearing 830, a rotating outer surface 852 (third surface) on the outer side of the shaft 821 and the raised part 855 in the radial direction is disposed close to the inner surface of the fixed inner bore 842. When the shaft 821 rotates relative to the first fixed yoke 811 and the second fixed yoke 812, the distance between the rotating outer surface 852 and the inner surface of the fixed inner bore 842 is kept substantially constant in a plane that is orthogonal to the central axis 801.

At least one of the first fixed yoke 811, the second fixed yoke 812, the third fixed yoke 813, and the rotating yoke 822 is preferably formed of a magnetic material. Using a magnetic material strengthens the magnetic field generated by the magnetic-field generator 814 and thereby makes it possible to save energy.

The magnetic viscous fluid 860 is present in a gap sandwiched in the radial direction between the rotating outer surface 852 and the inner surface of the fixed inner bore 842. Also, the magnetic viscous fluid 860 is present in a gap sandwiched in the vertical direction between the rotating upper surface 853 of the rotating yoke 822 and the fixed lower surface 841 of the second fixed yoke 812.

Further, the magnetic viscous fluid 860 is present in a gap sandwiched in the vertical direction between the rotating lower surface 854 of the rotating yoke 822 and the fixed upper surface 844 of the third fixed yoke 813. However, not all of the gaps are necessarily filled with the magnetic viscous fluid 860. For example, the magnetic viscous fluid 860 may be present only on the side of the rotating upper surface 853 or the side of the rotating lower surface 854. The magnetic viscous fluid 860 is in contact with and spread as a thin film over the rotating yoke 822, the second fixed yoke 812, and the third fixed yoke 813.

The first part 810 further includes an O-ring 846 disposed to surround the shaft 821 from the outer side in the radial direction.

The O-ring 846 seals the gap sandwiched between the rotating outer surface 852 and the inner surface of the fixed inner bore 842. The shaft 821 and the O-ring 846 can rotate relative to each other while keeping the gap sealed. The O-ring 846 is made of, for example, rubber.

The input device 800 of the second embodiment can be controlled by a control method similar to the control method of the input device 100 of the first embodiment. Therefore, descriptions of the control method of the input device 800 are omitted here.

In the input device 800 of the second embodiment, the magnetic viscous fluid 860 is used to control the resistance against relative rotation between the first part 810 and the second part 820. This configuration makes it possible to reduce the size of the input device 800 compared with a related-art configuration where a motor is used, and makes it possible to generate an operation feeling more quietly compared with a related-art configuration where a frictional force between solids is used. The input device 800 of the second embodiment includes the O-ring 846. This configuration makes it possible to prevent the magnetic viscous fluid 860 from flowing into a part of the input device 800 above the O-ring 846.

Next, an input device according to a third embodiment is described with reference to FIG. 9 that is a partial enlarged view. The input device of the third embodiment includes a cam 910, a contact part 920, and an elastic part 930 in addition to the components of the input device 100 of the first embodiment illustrated in FIG. 1.

Figure 9:
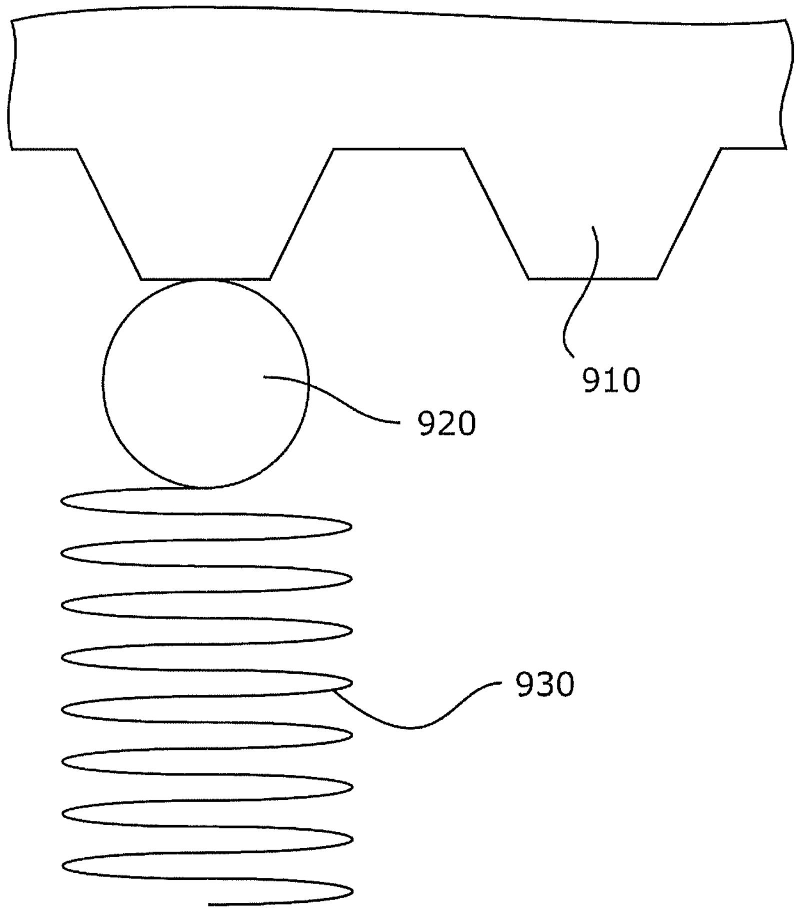
FIG. 9 is a partial enlarged view of an input device according to a third embodiment.

The cam 910 in FIG. 9 is provided in one of the first part 200 and the second part 300 in FIG. 1. The contact part 920 and the elastic part 930 in FIG. 9 are provided in the other one of the first part 200 and the second part 300 in FIG. 1. The cam 910 includes indentations and protrusions patterned in a predetermined shape.

The elastic part 930 biases the contact part 920 fixed to one end of the elastic part 930 against the cam 910. When the cam 910 moves relative to the contact part 920 and the elastic part 930, the contact part 920 moves along the predetermined shape of the cam 910. The elastic part 930 may be, for example, but is not limited to, a coil spring, a plate spring, rubber, or a gas spring.

A vibration is generated when the contact part 920 moves. The controller 620 in FIG. 6 is configured to suppress the vibration of the contact part 920. When the contact part 920 moves, the operational load changes due to changes in the pressure applied by the elastic part 930 to the cam 910. The controller 620 controls the magnetic-field generator 230 to change the magnetic field and thereby suppress the vibration (operational load variation) corresponding to the variation in the operational load that occurs according to a cam curve. For example, the controller 620 changes the magnetic field generated by the magnetic-field generator 230 based on a vibration detected by the detector 610. The relationship between the vibration and the magnetic field may be stored in advance, may be calculated according to a formula, or may be obtained by any other method. For example, the controller 620 may be configured to change the magnetic field according to a predefined pattern based a position detected by the detector 610. Also, the controller 620 may be configured to change the magnetic field to increase or decrease the primary load generated according to a cam curve based on an operation.

The input device of the third embodiment has an advantageous effect of generating a smooth operation feeling in addition to the advantageous effects of the input device 100 of the first embodiment.

An aspect of this disclosure provides a small, silent input device that can generate an operation feeling.

According to an embodiment, an input device includes a first part and a second part configured to move relative to each other according to an input operation, a magnetic viscous fluid whose viscosity changes according to a magnetic field, and a magnetic-field generator that generates the magnetic field applied to the magnetic viscous fluid. The second part includes a first surface and a second surface that are arranged in a direction orthogonal to a direction of relative movement between the first part and the second part. Gaps are formed between the first surface and the first part and between the second surface and the first part, and the magnetic viscous fluid is present in at least a part of the gaps.

This configuration makes it possible to change an operation feeling in moving the first part and the second part relative to each other by changing the viscosity of the magnetic viscous fluid using the magnetic field, and makes it possible to provide a small input device that can quietly generate different operation feelings.

According to an embodiment, the magnetic-field generator generates the magnetic field having a component that is orthogonal to the direction of relative movement between the first part and the second part.

This configuration makes it possible to control the resistance in the direction of relative movement between the first part and the second part.

According to an embodiment, the second part is configured to rotate relative to the first part, and the gaps are sandwiched between the first surface and the first part and between the second surface and the first part in a direction along a central axis of rotation between the first part and the second part.

This configuration makes it possible to control the resistance at a position where the first part and the second part face each other in a direction along the central axis.

According to an embodiment, the second part further includes a third surface that extends parallel to the central axis of rotation, and the magnetic viscous fluid is also present in at least a part of a gap that is sandwiched between the first part and the third surface in a direction orthogonal to the central axis of rotation.

This configuration makes it possible to control the resistance at a position where the first part and the second part face each other in a direction orthogonal to the central axis.

According to an embodiment, the input device further includes a controller that controls the magnetic-field generator to change the magnetic field, one of the first part and the second part includes a cam having a predetermined shape, another one of the first part and the second part includes a contact part and an elastic part that elastically biases the contact part against the cam, and the controller controls the magnetic-field generator to change the magnetic field such that a vibration of the contact part moving along the predetermined shape is suppressed.

This configuration makes it possible to suppress the vibration and generate a smooth operation feeling.

According to an embodiment, the input device further includes a detector that detects at least one of a relative position, a relative speed, and a relative acceleration between the first part and the second part, and a controller that changes the magnetic field by controlling the magnetic-field generator based on at least one of the relative position, the relative speed, and the relative acceleration.

This configuration makes it possible to generate an operation feeling corresponding to at least one of the position, the speed, and the acceleration.

Another aspect of this disclosure provides a method for controlling an input device including a first part and a second part that move relative to each other according to an input operation, a magnetic viscous fluid whose viscosity changes according to a magnetic field, and a magnetic-field generator that generates the magnetic field applied to the magnetic viscous fluid, the second part including a first surface and a second surface that are arranged in a direction orthogonal to a direction of relative movement between the first part and the second part, and gaps being formed between the first surface and the first part and between the second surface and the first part. The method includes changing the viscosity of the magnetic viscous fluid that is present in at least a part of the gaps by applying the magnetic field to the magnetic viscous fluid.

This configuration makes it possible to quietly generate an operation feeling with a small input device.

Input devices and methods for controlling the input devices according to embodiments of the present invention are described above. However, the present invention is not limited to the embodiments described above. A person skilled in the art may change, combine, partially combine, and replace the components described in the above embodiments without departing from the technical scope and the range of equivalence of the present invention.

The present invention is applicable to various input devices where the resistance between relatively-moving components is controlled.

What is claimed is:

1. An input device, comprising:
- a first part and a second part configured to move relative to each other according to an input operation;
- a magnetic viscous fluid whose viscosity changes according to a magnetic field; and
- a magnetic-field generator that generates the magnetic field applied to the magnetic viscous fluid, wherein
- the second part includes a first surface and a second surface that are arranged in a direction orthogonal to a direction of relative movement between the first part and the second part;
- gaps are formed between the first surface and the first part and between the second surface and the first part;
- the magnetic viscous fluid is present in at least a part of the gaps;
- the second part is configured to rotate relative to the first part; and
- the gaps are sandwiched between the first surface and the first part and between the second surface and the first part in a direction along a central axis of rotation between the first part and the second part.

2. The input device as claimed in claim 1, wherein the magnetic-field generator generates the magnetic field having a magnetic field component that is orthogonal to the direction of relative movement between the first part and the second part.

3. The input device as claimed in claim 1, wherein
- the second part further includes a third surface that extends parallel to the central axis of rotation; and
- the magnetic viscous fluid is also present in at least a part of a gap that is sandwiched between the first part and the third surface in a direction orthogonal to the central axis of rotation.

4. The input device as claimed in claim 1, further comprising:
- a controller that controls the magnetic-field generator to change the magnetic field, wherein
- one of the first part and the second part includes a cam having a predetermined shape;
- another one of the first part and the second part includes a contact part and an elastic part that elastically biases the contact part against the cam; and
- the controller controls the magnetic-field generator to change the magnetic field such that a vibration of the contact part moving along the predetermined shape is suppressed.

5. The input device as claimed in claim 1, further comprising:

a detector that detects at least one of a relative position, a relative speed, and a relative acceleration between the first part and the second part; and a controller that changes the magnetic field by controlling the magnetic-field generator based on at least one of the relative position, the relative speed, and the relative acceleration.

6. A method for controlling an input device including a first part and a second part that move relative to each other according to an input operation, a magnetic viscous fluid whose viscosity changes according to a magnetic field, and a magnetic-field generator that generates the magnetic field applied to the magnetic viscous fluid, the second part including a first surface and a second surface that are arranged in a direction orthogonal to a direction of relative movement between the first part and the second part, and gaps being formed between the first surface and the first part and between the second surface and the first part, the method comprising:

changing the viscosity of the magnetic viscous fluid that is present in at least a part of the gaps by applying the magnetic field to the magnetic viscous fluid;

detecting at least one of a relative position, a relative speed, and a relative acceleration between the first part and the second part; and changing the magnetic field by controlling the magnetic-field generator based on at least one of the relative position, the relative speed, and the relative acceleration.

7. An input device, comprising:

a first part and a second part configured to move relative to each other according to an input operation;

a magnetic viscous fluid whose viscosity changes according to a magnetic field; and a magnetic-field generator that generates the magnetic field applied to the magnetic viscous fluid, wherein the first part includes a first fixed yoke having a fixed lower surface and a second fixed yoke having a fixed upper surface, at least a portion of the first fixed yoke being formed of a magnetic material;

the second part includes a rotating yoke having a first surface and a second surface that are arranged in a direction orthogonal to a direction of relative movement between the first part and the second part;

the rotating yoke is disposed between the fixed lower surface and the fixed upper surface, and gaps are fainted between the first surface and the fixed lower surface and between the second surface and the fixed upper surface;

the magnetic viscous fluid is present in at least a part of the gaps;

the portion of the first fixed yoke formed of the magnetic material is disposed between the magnetic-field generator and the first surface; and the magnetic-field generator is disposed to face the first surface via the portion of the first fixed yoke formed of the magnetic material.

8. A method for controlling an input device that includes a first part and a second part configured to move relative to each other according to an input operation;

a magnetic viscous fluid whose viscosity changes according to a magnetic field; and a magnetic-field generator that generates the magnetic field applied to the magnetic viscous fluid, wherein the first part includes a first fixed yoke having a fixed lower surface and a second fixed yoke having a fixed upper surface, at least a portion of the first fixed yoke being formed of a magnetic material;

the second part includes a rotating yoke having a first surface and a second surface that are arranged in a direction orthogonal to a direction of relative movement between the first part and the second part;

the rotating yoke is disposed between the fixed lower surface and the fixed upper surface, and gaps are formed between the first surface and the fixed lower surface and between the second surface and the fixed upper surface;

the portion of the first fixed yoke formed of the magnetic material is disposed between the magnetic-field generator and the first surface; and the magnetic-field generator is disposed to face the first surface via the portion of the first fixed yoke formed of the magnetic material, the method comprising:

changing the viscosity of the magnetic viscous fluid that is present in at least a part of the gaps by applying the magnetic field to the magnetic viscous fluid.

9. An input device, comprising:

a first part and a second part configured to move relative to each other according to an input operation;

a magnetic viscous fluid whose viscosity changes according to a magnetic field; and a magnetic-field generator that generates the magnetic field applied to the magnetic viscous fluid, wherein the first part includes a first fixed yoke including an annular bearing that rotatably supports the second part, a second fixed yoke, and a third fixed yoke;

the magnetic-field generator is disposed between the first fixed yoke and the second fixed yoke;

the second part includes a first surface and a second surface that are arranged in a direction orthogonal to a direction of relative movement between the first part and the second part;

gaps are formed between the first surface and the second fixed yoke and between the second surface and the third fixed yoke; and the magnetic viscous fluid is present in at least a part of the gaps.

10. A method for controlling an input device that includes a first part and a second part configured to move relative to each other according to an input operation;

a magnetic viscous fluid whose viscosity changes according to a magnetic field; and a magnetic-field generator that generates the magnetic field applied to the magnetic viscous fluid, wherein the first part includes a first fixed yoke including an annular bearing that rotatably supports the second part, a second fixed yoke, and a third fixed yoke;

the magnetic-field generator is disposed between the first fixed yoke and the second fixed yoke;

the second part includes a first surface and a second surface that are arranged in a direction orthogonal to a direction of relative movement between the first part and the second part; and gaps are formed between the first surface and the second fixed yoke and between the second surface and the third fixed yoke, the method comprising:

changing the viscosity of the magnetic viscous fluid that is present in at least a part of the gaps by applying the magnetic field to the magnetic viscous fluid.

* * * * *